(12) United States Patent
Onoda

(10) Patent No.: US 6,287,502 B1
(45) Date of Patent: Sep. 11, 2001

(54) METHOD OF MANUFACTURING A CONNECTOR

(75) Inventor: Katsuhiko Onoda, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/525,767

(22) Filed: Mar. 14, 2000

Related U.S. Application Data

(62) Division of application No. 09/219,483, filed on Dec. 23, 1998.

(30) Foreign Application Priority Data

Dec. 25, 1997 (JP) .................................................. 9-357782

(51) Int. Cl.⁷ .............................. B29C 70/70; B29C 33/14
(52) U.S. Cl. ........................... 264/263; 264/277; 29/883; 29/884
(58) Field of Search .................................... 264/274, 275, 264/277, 261, 263, 271.1, 272.11; 29/876, 877, 883, 884; 174/76, 77 R; 439/736

(56) References Cited

U.S. PATENT DOCUMENTS

| | | | |
|---|---|---|---|
| 5,274,918 | * 1/1994 | Reed | 29/883 |
| 5,446,626 | 8/1995 | Dittman et al. | 361/813 |
| 5,527,502 | * 6/1996 | Kiuchi et al. | 264/277 |
| 5,560,884 | * 10/1996 | Ysbrand | 264/277 |
| 5,697,817 | 12/1997 | Bouchan et al. | 439/676 |
| 5,766,943 | 6/1998 | Talend | 439/76 |
| 5,777,851 | 7/1998 | Yamamoto | 361/813 |
| 5,823,797 | 10/1998 | Sugiyama | 439/76.1 |
| 5,855,834 | * 1/1999 | Ysbrand | 264/277 |
| 5,926,952 | * 7/1999 | Ito | 29/883 |
| 5,967,858 | 10/1999 | Yamada | 439/736 |
| 6,019,928 | * 2/2000 | Fujitani et al. | 264/263 |
| 6,045,739 | * 4/2000 | Abe | 264/277 |
| 6,048,482 | * 4/2000 | Lemke et al. | 29/883 |

FOREIGN PATENT DOCUMENTS 8-250193  9/1996 (JP) .

* cited by examiner

Primary Examiner—Angela Ortiz
(74) Attorney, Agent, or Firm—Finnegan, Henderson, Farabow, Garrett & Dunner, L.L.P.

(57) ABSTRACT

A connector has a connector body. A plurality of first terminal bodies are arranged within the connector body. A plurality of second terminal bodies are arranged along the first terminal bodies within the connector body at an interval between themselves and the first terminal bodies. Each of the second terminal bodies is located between the first terminal bodies and each of the first terminal bodies is located between the second terminal bodies.

5 Claims, 3 Drawing Sheets

FIG.1A
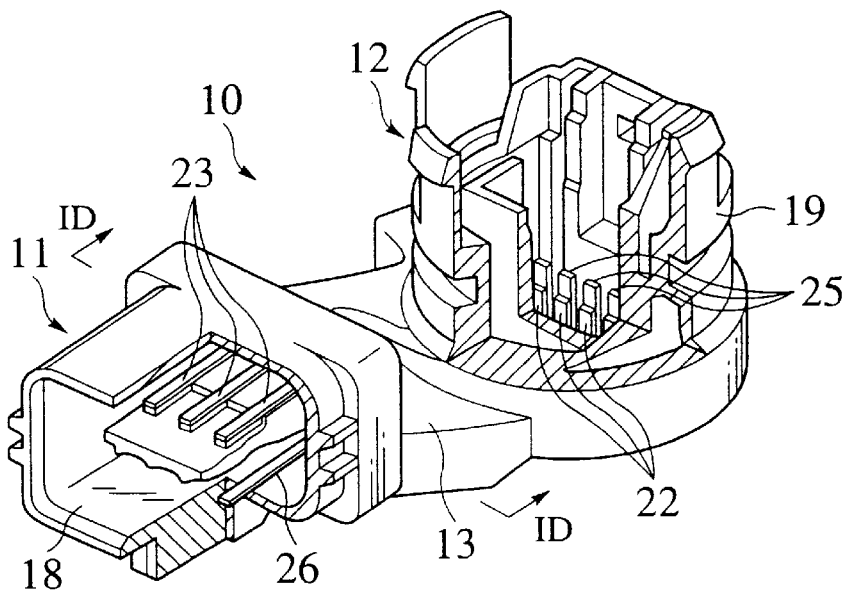
FIG.1B
FIG.1C
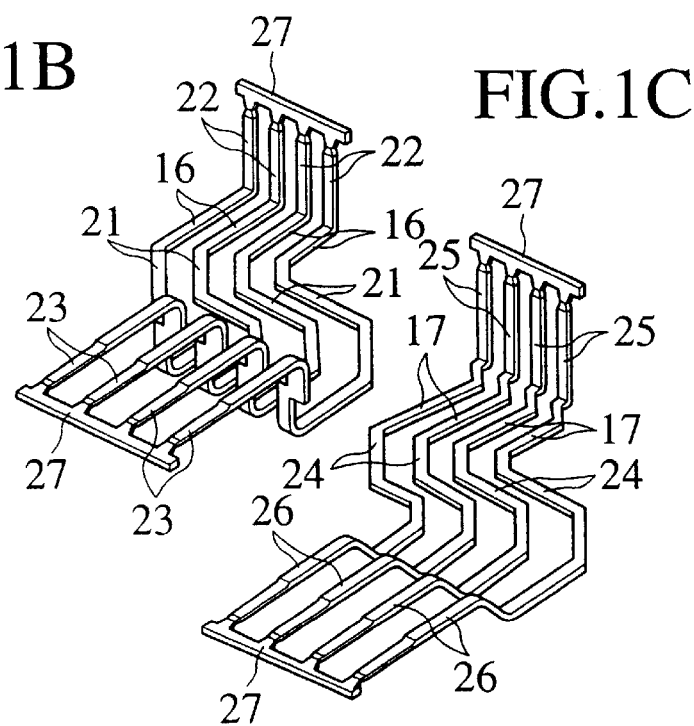
FIG.1D
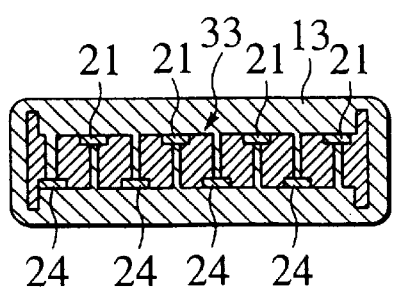

METHOD OF MANUFACTURING A CONNECTOR

This is a division of application Ser. No. 09/219,483, filed Dec. 23, 1998, currently pending, which claims priority to Japanese application Ser. No. P 9-357782, filed Dec. 25, 1997, all of which are incorporated herein by reference.

BACKGROUND OF THE INVENTION

1. Field of the Invention

The present invention relates to a connector having a connector body within which a plurality of terminal fittings are insert molded, a method of manufacturing the connector, and a die structure for use in this manufacturing method, and is used on vehicles, for example, an automobile, a motorcycle.

2. Description of the Related Art

Conventionally, a connector is used to ensure the electric connection and electric insulation.

As an example, there can be taken up a connector that is made of synthetic resin (refer to Japanese Patent Application Laid-Open Publication No.8-250193). This connector comprises a connector body having formed integrally on both sides thereof with hood parts to which mate connectors are fitted, and terminal metal fittings having terminal bodies insert molded within the connector body and having on both end sides of the terminal bodies terminal portions that are provided within the hood parts in such a way as to be projected thereinto.

In this connector, in a case where insert molding the terminal bodies into the connector body, the terminal bodies of the plural terminal metal fittings are integrally molded beforehand in a first molded part. This first molded part is integrally formed into a connector of a final configuration when formed into it. As a result of this, insulation is ensured between a plurality of the terminal metal fittings and the terminal metal fittings are positioned with the interspace therebetween being set to a prescribed pitch.

However, in the above-described manufacturing method, in a case where integrally molding a plurality of the terminal metal fittings into the first molded part with these terminal metal fittings set as one stage being arranged in two stages, although the first stage terminal metal fittings can be supported within a die for molding the first molded part, the second stage terminal metal fittings are located in a supportless space and therefore cannot be supported within the die. As a result, in the above-described manufacturing method, a plurality of the terminal metal fittings can be molded integrally with the first molded part only in a one-stage state of their being arranged laterally. For this reason, when the number of the terminal metal fittings increases (the connector has a multipole structure), the width dimension of the connector becomes large, with the result that the connector becomes large in size.

SUMMARY OF THE INVENTION

In view of the above, an object of the present invention is to provide a connector which makes it possible to position a plurality of terminal bodies at prescribed pitches and, while ensuring the insulation therebetween, to integrally mold them in two stages within the connector body, a method of manufacturing the connector, and a die structure for executing this method.

A first aspect of the present invention provides a connector body which is made of an insulating material, has a side, and has on the side thereof a fitting portion formed integrally therewith which is one for fitting a mate connector thereto. There are provided a plurality of first terminal fittings which have first terminal bodies and first terminal portions. The first terminal bodies are insert molded within the connector body and are arranged in a first stage within the connector body. The first terminal portions project to the fitting portion of the connector body. There are provided a plurality of second terminal fittings which have second terminal bodies and second terminal portions. The second terminal bodies are insert molded within the connector body and are arranged in a second stage within the connector body. The second terminal portions project to the fitting portion of the connector body. The first terminal bodies in the first stage and the second terminal bodies in the second stage are arranged in such a stagger-shape that there is located each of the first terminal bodies between adjacent ones of the second terminal bodies and there is located each of the second terminal bodies between adjacent ones of the first terminal bodies.

In this connector, a plurality of the first terminal bodies in the first stage and a plurality of the second terminal bodies in the second stage are arranged in such stagger-shape that there are located the first terminal bodies in the first stage between adjacent ones of the second terminal bodies in the second stage. As a result of this, when arranging these two stages of the first and second terminal bodies between the dies, the first and second terminal bodies can be pressed by the pressing pins that have been made to project from the respective dies and passed between the terminal bodies. As a result, the first and second terminal bodies can be arranged in two stages between the dies. Therefore, the connector body is molded in this state, and the first and second terminal fittings can be arranged in two stages within the connector body with a prescribed number thereof being set as one stage.

In above invention, "insert mold" means that an insert die is used in molding.

A second aspect of the present invention provides a method of manufacturing a connector which comprises: connecting a plurality of first terminal portions on end sides of first terminal bodies with each other; connecting a plurality of terminal portions on end sides of second terminal bodies with each other; arranging between a first die and a second die a plurality of first terminal bodies of first terminal fittings and a plurality of second terminal portions of second terminal fittings in a stagger-shape that there is located each of the first terminal bodies in a first stage between adjacent ones of the second terminal bodies in a second stage and there is located each of the second terminal bodies in the second stage between adjacent ones of the first terminal bodies in the first stage; bringing a plurality of first terminal bodies of first terminal fittings in a first stage in contact with a first die by second pressing pins projecting from a second die and passing between second terminal bodies of second terminal fittings in a second stage; bringing a plurality of second terminal bodies of second terminal fittings in a second stage in contact with a second die by first pressing pins projecting from a first die and passing between first terminal bodies of first terminal fittings in a first stage; filling an insulating material into between a first die and a second die to mold a primary molded part; and molding integrally a primary molded part when forming it into a connector of a final configuration.

In this method of manufacturing the connector, when molding the primary molded part, a plurality of the first terminal fittings in the first stage and the second terminal fittings in the second stage are arranged between the dies in a state where a plurality of the first and second terminal portions on end sides of the first and second terminal bodies in each stage respectively are connected together in such a stagger-shape that there are located the first terminal bodies in the first stage between adjacent ones of the second terminal bodies in the second stage. The second terminal bodies in the second stage are abutted onto the second die side by the first pressing pins that have been made to project from first die and passed between the first terminal bodies in the first stage. The first terminal bodies in the first stage are abutted onto the first die side by the second pressing pins that have been made to project from the second die and passed between the second terminal bodies in the second stage. As a result, the first and second terminal bodies are integrally molded in two stages in the primary molded part. This primary molded part is integrally molded when forming it into a connector of a final configuration, and thus the first and second terminal bodies can be arranged in two stages within the connector body.

Also, a plurality of the first and second terminal fittings are integrally molded with the primary molded part in a state where the first and second terminal portions on end sides of the first and second terminal bodies respectively are connected together, and thus the terminal fittings can be positioned at prescribed pitches to thereby ensure the insulation therebetween.

Preferably, after having molded the primary molded part the connected first and second terminal portions on end sides of the first and second terminal bodies in each stage are released, the primary molded part is molded integrally when forming it into a final configuration, and the first and second terminal portions are projected within a fitting portion of a connector body.

In this manufacturing method of manufacturing the connector, the primary molded part wherein the first and second terminal bodies are integrally molded in a two-stage state is integrally molded when formed into a connector of a final configuration, with the result that the first and second terminal bodies of the first and second terminal fittings are positioned in a two-stage state at a prescribed pitch within the connector body and are molded integrally therewith and, on the other hand, the first and second terminal portions thereof are projectively arranged within the fitting portions on both sides of the connector body.

A third aspect of the present invention provides a die structure for use in a manufacture of a connector which comprises a first die; a second die which is arranged opposite to first die; a plurality of first pressing pins which are projectively provided on the first die and ones for pressing between themselves and the second die second terminal bodies in a second stage; and a plurality of second pressing pins which are projectively provided on the second die and ones for pressing between themselves and the first die first terminal bodies in a first stage. Each of the plural first pressing pins pass between adjacent ones of the plural second pressing pins and each of the plural second pressing pins pass between adjacent ones of the plural first pressing pins. The first terminal bodies and said second terminal bodies are arranged between the first die and the second die in such a stagger-shape that there is located each of the first terminal bodies in the first stage between adjacent ones of the second terminal bodies in the second stage.

In this die structure, the first and second pressing pins are projected respectively from the first (stationary) die and second (movable) die and are passed between the terminal bodies arranged in a stagger-shape, whereby the first and second terminal bodies in each stage can be abutted on the die in the opponent stage. Therefore, a plurality of the terminal bodies are integrally formed in two stages within the connector body.

A fourth aspect of the present invention provides a connector comprising: a connector body; a plurality of first terminal bodies which are arranged in a row within the connector body; and a plurality of second terminal bodies which are arranged along the first terminal bodies within the connector body at an interval between themselves and the first terminal bodies. Each of the second terminal bodies is located between the first terminal bodies and each of the first terminal bodies is located between the second terminal bodies.

A fifth aspect of the present invention provides a die structure for use in a manufacture of a connector, comprising: a first die; a second die which is arranged opposite to the first die; a plurality of first pressing pins which project from the first die toward the second die and are ones for holding second terminal bodies with the second die; and a plurality of second pressing pins which project from the second die toward the first die and are ones for holding first terminal bodies with the first die. Each of the first pressing pins is located between the second pressing pins and each of the second pressing pins is located between the first pressing pins.

BRIEF DESCRIPTION OF THE DRAWINGS

FIG. 1A is a perspective view illustrating a final configuration of a connector according to the present invention;

FIG. 1B is a perspective view illustrating upper-stage side terminal metal fittings integrally formed with respect to the connector;

FIG. 1C is a perspective view illustrating lower-stage side terminal metal fittings integrally formed with respect to the connector;

FIG. 1D illustrating a main body of the connector and is a sectional view taken along a line ID—ID of FIG. 1A;

DETAILED DESCRIPTION OF THE PREFERRED EMBODIMENTS

Figure 2:
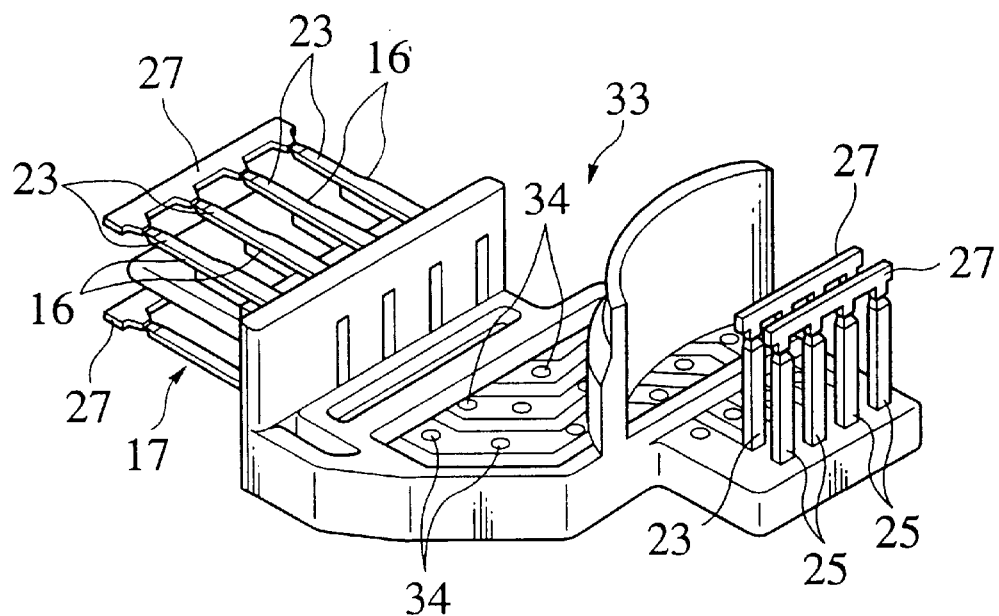
FIG. 2 is a perspective view illustrating a primary molded part.

An embodiment of each of a connector, method of manufacturing the connector and die structure used for carrying out this method will now be explained. First, a connector 10 according to the embodiment will be explained.

As illustrated in FIGS. 1A, 1B and 1C, the connector 10 comprises a connector body 13 formed integrally on both sides thereof with fitting portions 11 and 12 to which mate connectors (not illustrated) are fitted, the connector body 13 made of insulating material, and a plurality of terminal metal fittings 16 and 17 having terminal bodies 21 and 24 and provided on both end sides thereof terminal portions 22, 23 and 25, 26 which are projectively arranged in the fitting portions 11 and 12.

A hood part 18 rectangular in cross section is provided to the fitting portion 11 provided on one side of the connector body 13. Inside this hood part 18 there are projectively arranged the terminal portions 23, 26 that are located on one side. A hood part 19 circular in cross section is provided to the fitting portion 12 provided on the other side of the connector body 13. Inside this hood part 19 there are projectively arranged the terminal portions 22, 25 that are located on the other side.

Also, the directions in which the fitting portions 11 and 12 are open differ from each other. The fitting portion 11 is open toward one side of the connector body 13 and the fitting portion 12 is open in the upper surface direction of the connector body 13. Mate connectors are fitted to the interiors of the hood parts 18 and 19 of these fitting portions 11 and 12, respectively, and the one side terminal portions 23 and 26 and the other side terminal portions 22 and 25 are connected to the contact portions of terminal metal fittings (in this embodiment, female terminal metal fittings) accommodated in the mate connectors, respectively.

Also, a plurality of the terminal metal fittings 16 and 17 are arranged in such a way that the respective terminal bodies 21, 24 are arranged in two stages within the connector body 13 with a prescribed number (in this embodiment, four pieces) of the terminal bodies being set as one stage. As illustrated in FIGS. 1A and 1B, there are respectively formed the terminal portions 22 and 23 on both end sides of the terminal body 21 whose intermediate portion is bent, in each of the four terminal metal fittings 16 located on the upper stage side and the terminal portions 23 rise with respect to the terminal portion 22. The terminal portion 22 and the terminal portion 23 are projectively arranged within the hood part 19 and the hood part 18, respectively. There are respectively formed the terminal portions 25 and 26 on both end sides of the terminal body 24 in each of the terminal metal fittings 17 located on the lower stage side, and the terminal portion 26 and the terminal portion 25 are projectively arranged within the hood part 18 and the hood part 19, respectively.

Also, as illustrated in FIG. 1D, there is located each terminal body 24 of one stage side terminal metal fittings 17 between the terminal bodies 21 and 21 of each two adjacent upper stage side terminal metal fittings 16 and 16. Namely, the plural terminal metal fittings 16 and the plural terminal metal fittings 17 are arranged within the connector body 13 in a stagger-shape.

Next, a manufacturing method of the above-described connector 10 will be explained.

As illustrated in FIGS. 1B and 1C, in a state where the terminal portions 22 and 23 on both end sides of the four terminal metal fittings 16 located on the upper stage side, and the terminal portions 25 and 26 on both end sides of the four terminal metal fittings 17 located on the lower stage side, within the connector body 13 are respectively mutually connected together by means of connection plates 27, the terminal metal fittings 16, 17 are formed. In this state, the four upper stage side terminal metal fittings 16 and four lower stage side terminal metal fittings 17 are respectively integrated together at prescribed pitches.

Figure 3A:
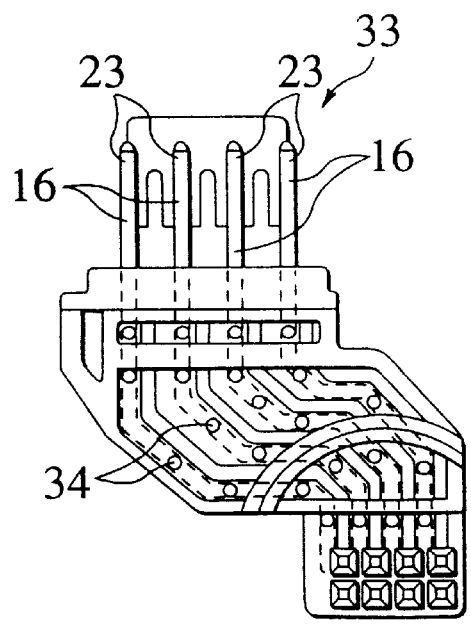
FIG. 3A is a plan view illustrating a primary molded part.
Figure 3B:
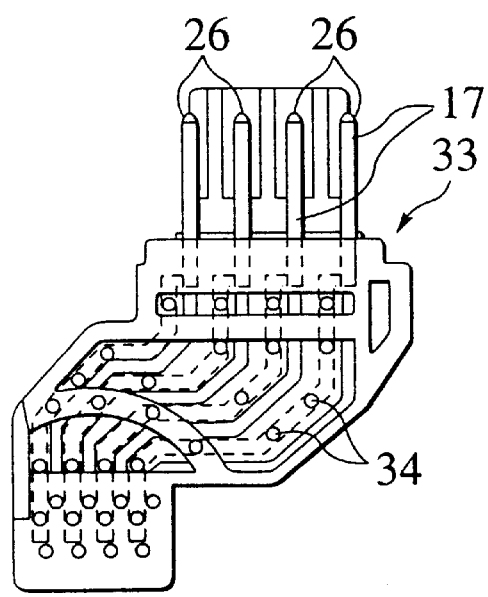
FIG. 3B is a lower surface view illustrating the primary molded part.
Figure 4:
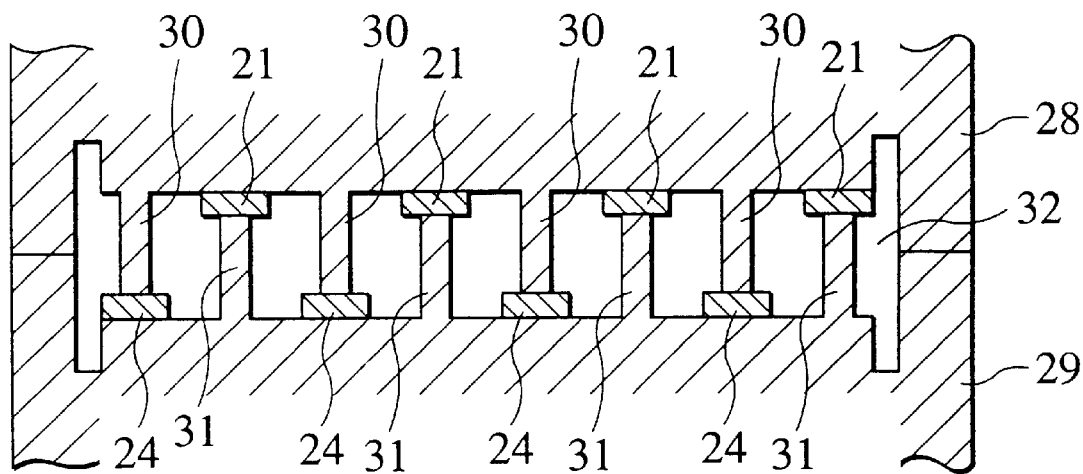
FIG. 4 is a sectional view illustrating the state between a stationary die and a movable die that prevails when forming the primary molded part.

Next, as illustrated in FIG. 4, the terminal metal fittings 16, 17 are arranged between an upper die (movable die) 28 and a lower die (stationary die) 29 in such a stagger-shape that there are respectively located the terminal bodies 24, 24 of the terminal metal fittings 17 on one stage side between the terminal bodies 21, 21 of adjacent terminal metal fittings 16, 16 on the other stage side. Further, the terminal bodies 24 on the lower stage side are abutted onto the lower die 29 side by pressing pins 30 that have been made to project from the upper die 28 and passed between the terminal bodies 21, 21 on the upper stage side. Further, the terminal bodies 21 on the upper stage side are abutted onto the upper die 28 side by pressing pins 31 that have been made to project from the lower die 29 and passed between the terminal main bodes 24, 24 on the lower stage side. In this state, an insulating material such as molten resin is filled into a gap 32 between the upper die 28 and lower die 29. As a result of this, a primary molded part 33 illustrated in FIGS. 2, 3A and 3B is molded. In this primary molded part 33, the terminal bodies 21, 24 of the respective terminal metal fittings 16, 17 are positioned at prescribed pitches and an insulated state thereof is ensured.

Next, this primary molded part 33 is formed into one integral molded product when forming it into the connector 10 of a final configuration. As a result of this, the connector 10 illustrated in FIG. 1A is completed.

Figure 5:
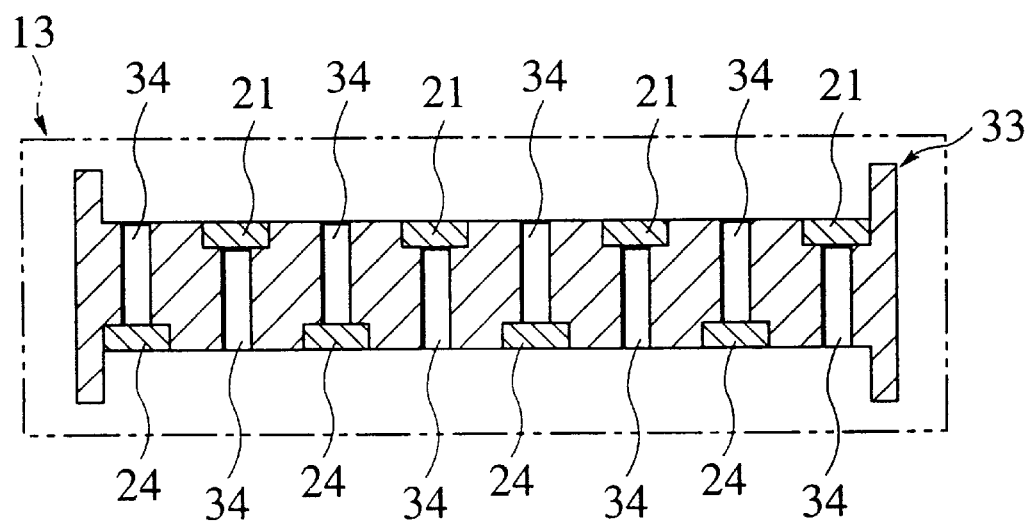
FIG. 5 is a sectional view illustrating the primary molded part.

It is to be noted that as illustrated in FIG. 5 in both surfaces of the primary molded part 33 the portions corresponding to the pressing pins 30, 31 projected from the upper die 28 and lower die 29 are formed as small holes 34. When forming the connector 10 of a final configuration, molten resin is entered into these small holes 34 which therefore are blocked. As a result, there is no possibility that the terminal bodies 21, 24 will be exposed.

In this connector manufacturing method, when forming the primary molded part 33, the terminal metal fittings 16, 17 of the two, upper/lower, stages are arranged in such a way that the terminal bodies 21, 24 are staggered. As a result, the pressing pins 30, 31 that have been projected from the upper die 28 and lower die 29 can pass between the terminal bodies 21 and the terminal bodies 24 and press their corresponding terminal bodies 24, 21. As a result of this, it is possible to mold the primary molded part 33 with the terminal metal fittings 16, 17 arranged in two, upper/lower, stages. This primary molded part 33 is integrally molded when formed into the connector 10 of a final configuration, and the terminal bodies 21, 24 be arranged in two stages within the connector body 13.

Accordingly, the connector 10 is prevented from becoming large in size in its widthwise direction even when the number of the terminal metal fittings becomes large (even when the connector 10 becomes a multipole connector), and so be formed into a compact configuration.

Also, the plural terminal metal fittings 16 and the plural terminal fittings 17 are respectively mutually connected together at the terminal portions 22, 23 and 25, 26 on respective both end sides thereof, and in this state the terminal metal fittings 16 and 17 are integrally molded with the primary molded part 33. Thus, the terminal metal fittings 16, 17 be positioned reliably at prescribed pitches. In addition, when molding the primary molded part 33 the terminal bodies 24, 21 are respectively pressed by the pressing pins 30, 31, and the insulation between the terminal metal fittings 16 and 17 is ensured.

Also, the terminal metal fittings 16 and 17 are positioned by the primary molded part 33 so that the interspace therebetween may have a prescribed pitch, and when forming the connector 10 of a final product, also, the terminal metal fittings 16 and 17 are prevented from being moved between the upper die 28 and the lower die 29 due to the pressure of the resin used for forming connector 10. Thus, a reliable insulation therebetween is obtained.

It is to be noted that the connection plates 27 connecting together respective ones of the respective terminal portions 22, 23 and 25, 26 of the plural terminal metal fittings 16 and 17 may be cut off after having formed the primary molded part 33 into the connector 10 in a final configuration or after having molded the primary molded part 33.

Also, the die structure of this embodiment has the upper die (movable die) 28 and the lower die (stationary die) 29 arrangedopposite to each other, and the pressing pins 30,31 are projectively provided on the upper die 28 and lower die 29. The pressing pins 30, 31 press between themselves and the mutually opposed upper die 28 or lower die 29 the terminal bodies 21, 24 arranged in two stages in a stagger-shape so that the terminal bodies 24 on the lower stage are located between the adjacent terminal bodies 21 on the upper stage, respectively.

What is claimed is:

1. A method of manufacturing a connector including a plurality of first terminal fittings having first terminal bodies and first terminal portions, and a plurality of second terminal fittings having second terminal bodies and second terminal portions, the method comprising:

arranging between a first die and a second die the plurality of first terminal bodies of the first terminal fittings in a first stage and the plurality of second terminal bodies of second terminal fittings in a second stage, said first die having a plurality of first pressing pins projecting from said first die, said second die having a plurality of second pressing pins projecting from said second die, wherein said first terminal bodies in said first stage and said second terminal bodies in said second stage are staggered so that all but one of said first terminal bodies is located between adjacent ones of said second terminal bodies and all but one of said second terminal bodies is located between adjacent ones of said first terminal bodies;

bringing the plurality of first terminal bodies of the first terminal fittings in the first stage in contact with the first die by said second pressing pins passing between second terminal bodies of second terminal fittings in the second stage;

bringing the plurality of second terminal bodies of the second terminal fittings in the second stage in contact with the second die by said first pressing pins passing between first terminal bodies of first terminal fittings in the first stage;

filling an insulating material between the first die and the second die to mold a primary molded part; and molding an insulating material around the primary molded part to form the connector having a final configuration.

2. The method of manufacturing a connector according to claim 1, wherein molding integrally the primary molded part to form the connector of a final configuration includes molding fitting portions.

3. The method of manufacturing a connector according to claim 2, wherein said plurality of first terminal fittings are interconnected at said first terminal portions by plates, said plurality of second terminal fittings are interconnected at said second terminal portions by second plates, the method further comprising:

releasing the first plates of said first terminal fittings after molding said primary molded part;

releasing the second plates of said second terminal fittings after molding said primary molded part; and wherein said first and second terminal portions project within fitting portions of the connector.

4. A method of manufacturing a connector according to claim 2, wherein said plurality of first terminal fittings are interconnected at said first terminal portions by first plates, said plurality of second terminal fittings are interconnected at said second terminal portions by second plates, the method further comprising:

releasing the first plates of said first terminal fittings after molding said connector;

releasing the second plates of said second terminal fittings after molding said connector; and wherein said first and second terminal portions project within the fitting portions of the connector.

5. The method of manufacturing a connector according to claim 1, wherein said plurality of first terminal fittings are interconnected at said first terminal portions by plates, said plurality of second terminal fittings are interconnected at said second terminal portions by second plates, the method further comprising:

releasing the first plates of said first terminal fittings after molding said primary molded part;

releasing the second plates of said second terminal fittings after molding said primary molded part.

* * * * *